(12) United States Patent
Sapsford

(10) Patent No.: US 6,216,662 B1
(45) Date of Patent: Apr. 17, 2001

(54) DIRECT INJECTION GASOLINE ENGINES

(75) Inventor: Stephen Michael Sapsford, Worthing (GB)

(73) Assignee: Ricardo Consulting Engineers Limited, West Sussex (GB)

( * ) Notice: Subject to any disclaimer, the term of this patent is extended or adjusted under 35 U.S.C. 154(b) by 0 days.

(21) Appl. No.: 09/404,419

(22) Filed: Sep. 23, 1999

(30) Foreign Application Priority Data

Sep. 28, 1998 (GB) .................................................. 9821052

(51) Int. Cl.[7] .................................................. F02B 17/00
(52) U.S. Cl. ............................ 123/301; 123/276; 123/279
(58) Field of Search .................................... 123/301, 298, 123/276, 279, 269

(56) References Cited

U.S. PATENT DOCUMENTS

| | | | | |
|---|---|---|---|---|
| 5,553,588 | * | 9/1996 | Gono et al. ........................... | 123/276 |
| 5,806,482 | * | 9/1998 | Igarashi et al. ...................... | 123/259 |
| 5,943,993 | * | 8/1999 | Carstensen et al. .................. | 123/298 |
| 5,979,399 | * | 11/1999 | Piock et al. ........................... | 123/301 |
| 5,996,548 | * | 12/1999 | Hellmich ............................... | 123/295 |
| 6,035,822 | * | 3/2000 | Suzuki et al. ......................... | 123/276 |

FOREIGN PATENT DOCUMENTS 0694682    1/1996   (EP) .

* cited by examiner

Primary Examiner—Henry C. Yuen
Assistant Examiner—Hieu T. Vo
(74) Attorney, Agent, or Firm—Reed Smith LLP

(57) ABSTRACT

A direct injection gasoline engine includes at least one cylinder, a piston reciprocably mounted within the cylinder, a cylinder head closing the cylinder and at least one inlet port adapted to cause swirl of the inlet air in the cylinder substantially about the axis of the cylinder. The crown of the piston is provided with a recess which has a floor and a side wall and constitutes at least part of the combustion chamber. A spark plug extends close to or into the recess, at the top dead centre position of the piston, at a position adjacent to the side wall of the recess. A fuel injector is arranged to inject fuel into the recess and is situated adjacent the side wall of the recess. That portion of the side wall of the recess which is between the fuel injector and the spark plug is arcuate, when viewed in the axial direction of the cylinder. The floor of the recess adjacent the said portion of the side wall rises progressively towards the cylinder head over at least a part of its length in the direction towards the spark plug.

2 Claims, 5 Drawing Sheets

DIRECT INJECTION GASOLINE ENGINES

FIELD OF THE INVENTION

The present invention relates to direct injection (DI) gasoline engines, that is to say spark ignited gasoline engines in which the fuel is injected directly into the cylinder, and is concerned with that type of engine which includes at least one cylinder, a piston reciprocably mounted within the cylinder, a cylinder head closing the cylinder, at least one inlet valve adapted to cause swirl of the inlet air in the cylinder substantially about the axis of the cylinder, the piston crown being provided with a recess which constitutes at least part of the combustion chamber, the recess having a floor and a side wall, a spark plug extending close to or into the recess, at the top dead centre position of the piston, at a position adjacent to the side wall of the recess and a fuel injector which is arranged to inject fuel into the recess and is situated adjacent the side wall of the recess, that portion of the side wall of the recess which is between the fuel injector and the spark plug being arcuate, when viewed in the axial direction of the cylinder.

DESCRIPTION OF THE PRIOR ART

DI engines are becoming increasingly popular for a number of reasons, one of which is that they permit satisfactory operation under low load with stratified charging and thus achieve increased fuel economy at low load. In a conventionally carbureted engine running at low load the amount of fuel supplied is reduced to a low level and the amount of air admitted into the cylinder is also reduced to a correspondingly low level by virtue of the throttle valve being virtually closed. However, this results in substantial pumping losses and thus in a reduction in efficiency. It would of course not be possible to reduce the amount of fuel whilst leaving the throttle valve totally or largely open because this would result in the air/fuel ratio (AFR) within the cylinder rising above the maximum value of about 20:1 at which the air/fuel charge in the cylinder can be satisfactorily ignited by the spark plug. However, if stratified charging is used at low loads the air/fuel mixture within the cylinder is arranged to be non-homogeneous and thus it is possible for the overall AFR within the cylinder to be very much greater than 20:1 but for the AFR in the immediate vicinity of the spark plug at the instant that sparking occurs to be less than 20:1 whereby satisfactory ignition and combustion of the air/fuel mixture is possible. This can be done without substantially throttling the inlet duct and thus without incurring the efficiency penalty associated with pumping losses.

A DI engine of the type referred to above is disclosed in EP-A-0694682. The piston crown in this engine is provided with a recess which constitutes the combustion chamber. A spark plug extends a certain distance into the recess, at the top dead centre (TDC) position of the piston, adjacent one side wall of the recess and a fuel injector is provided adjacent the opposite side wall of the recess and arranged to spray fuel downwardly towards the floor of the recess and laterally towards the wall of the recess in the direction in which the air is caused to swirl in the cylinder by the swirl inducing port. The air and fuel is thus caused to swirl around within the recess and the fuel is forced predominantly, at least initially, into close proximity with the wall of the recess by virtue of centrifugal force and its greater density. Under high load conditions, a substantial amount of fuel is injected into the combustion chamber. This is mixed with the swirling air to form a substantially homogeneous mixture which is subsequently ignited by the spark plug. Under low load conditions, air and exhaust gas mixture is admitted into the cylinder with a significantly reduced amount of fuel. This is achieved by not significantly throttling the inlet duct and commencing injection of the fuel substantially later in the compression stroke. Due to the much shorter time between the commencement of fuel injection and ignition there is insufficient time for homogeneous mixing of the fuel and air to occur. Instead, a small relatively rich "pocket" of fuel and air swirls around within the combustion chamber in close proximity to the chamber wall. After this mixture has swirled through about 180° it will be in the vicinity of the spark plug and the spark timing is such that sparking then occurs. This ignites the fuel/air mixture, whose AFR is locally 20:1 or lower and which thus burns satisfactorily, despite the fact that outside the rich "pocket" of air/fuel mixture the gaseous charge is very much leaner than 20:1.

However, it is found that the engine disclosed in EP-A-0694682 does not work particularly satisfactorily in that there is only a relatively small range of engine load and speed within which stratified charge operation is satisfactory and that if the load and/or speed moves outside this range unsatisfactory combustion or misfiring occurs, thereby necessitating a return to conventional homogeneous charge operation. The engine runs substantially unthrottled during stratified charge operation, as discussed above, but when the engine reverts to homogeneous charge operation the engine inlet throttle again becomes operative and the engine efficiency drops due to the throttling losses referred to above. Thus the prior engine is obliged to run throttled and thus at lower efficiency over a relatively broad range of speeds and loads at which stratified charge operation would otherwise be appropriate, whereby the prior engine does not achieve the full benefit of stratified charge operation which is theoretically available.

It is therefore the object of the present invention to provide a DI engine of the type referred to above in which stratified charge operation is possible over a wider range of speeds and loads than the engine disclosed in EP-A-0694682 and thus achieves overall a higher efficiency and thus a lower overall specific fuel consumption.

SUMMARY OF THE INVENTION

According to the present invention, a DI engine of the type referred to above is characterised in that the floor of the recess adjacent the said portion of the side wall rises progressively towards the cylinder head over at least a part of its length in the direction towards the spark plug.

The invention is based on the recognition that the problem suffered by the engine disclosed in EP-A-0694682 is caused by the fact that it is only at low speeds and loads that the AFR in the vicinity of the spark plug is below the crucial level of about 20:1 and that when the speed rises above a low level the fuel is not satisfactorily ignited. This is thought to be due to the fact that the relatively rich "pocket" of air/fuel mixture which travels around adjacent the side wall of the recess stays very close to or "hugs" the floor of the recess whilst the spark gap of the spark plug is not situated particularly close to the floor of the recess. It is therefore only at particularly low speeds that the spark gap of the spark plug is within an area of the air/fuel mixture which is sufficiently rich to be ignited satisfactorily. However, if the speed of the engine increases somewhat it will be appreciated that the spark is produced after a slightly shorter period of time after the termination of the injection of fuel than at lower speeds. This means that the rich region of the air/fuel mixture has not quite reached the spark gap and thus that unsatisfactory ignition occurs. The rich region of air/fuel mixture does of course not have a homogeneous AFR but tends to be richest in the centre and to become progressively weaker with increasing distance from the centre. However, the fact that the centre of the "pocket" of fuel is spaced in the axial direction of the cylinder from the spark gap means that the tolerance to circumferential spacing is relatively limited. It is not possible for the spark plug to extend a very substantial distance down into the recess in the piston crown and because the rich air/fuel mixture tends to hug the floor of the recess there is only a very limited range of speeds at which the spark gap is within a region of the air/fuel mixture which is sufficiently rich to be ignited satisfactorily. It is not possible to make the recess significantly shallower because it is the volume of the recess which determines the compression ratio of the engine which means that its volume may not be altered. It is also not practicable to move the spark plug so that it projects further down into the recess of the piston crown because this would lead to problems such as overheating and premature erosion and thus failure of the spark plug.

However, in the engine in accordance with the invention the floor of the recess adjacent the said portion of the side wall rises progressively towards the cylinder head over at least a part of its length in a direction towards the spark plug which means effectively that the recess in the piston crown is provided with a ramp which rises towards the spark plug. This ramp imparts a component of motion to the rich air/fuel mixture in the direction towards the cylinder head, that is to say towards the spark gap of the spark plug. This means that the rich portion of the air/fuel mixture is caused to flow such that its centre is caused to pass approximately through the spark gap of the spark plug, at least at one engine speed, and thus that the engine has a greater tolerance to the rich portion of the air/fuel mixture being offset from the spark gap in the circumferential direction, that is to say in the direction of the length of the said portion of the side wall, at the instant that sparking occurs.

It is therefore found that the engine in accordance with the present invention may operate satisfactorily with stratified charging over a wider range of engine speeds than the engine disclosed in EP-A-0694682 and thus that it is necessary for the engine in accordance with the present invention to switch over to homogeneous charging at a higher speed than was previously possible. This results in an increase in the overall fuel efficiency of the engine.

In the preferred embodiment the floor of the recess also sinks progressively away from the cylinder head in the radially outward direction of the cylinder towards the said portion of the side wall over at least a proportion of the length thereof. The action of centrifugal force together with the fact that the piston is moving towards the cylinder head during the time at which fuel is injected into the cylinder means that the fuel, that is to say the rich portion of the fuel/air mixture, tends to concentrate at the junction between the base and the side wall of the recess in the piston crown. The fact that the floor of the recess falls progressively in a radially outward direction of the cylinder towards the said portion of the side wall results in a concentration of the rich air/fuel mixture into a relatively small region, which region moves circumferentially within the recess along the said portion of the side wall due to the swirling motion imparted to it by the swirl inducing inlet port and also moves upwardly, that is to say towards the spark plug, caused by the rising ramp on the floor of the recess adjacent the said portion of the side wall.

Further features and details of the invention will be apparent from the following description of one specific embodiment which is given by way of example with reference to the accompanying schematic drawings.

DESCRIPTION OF THE PREFERRED EMBODIMENT

Figure 1:
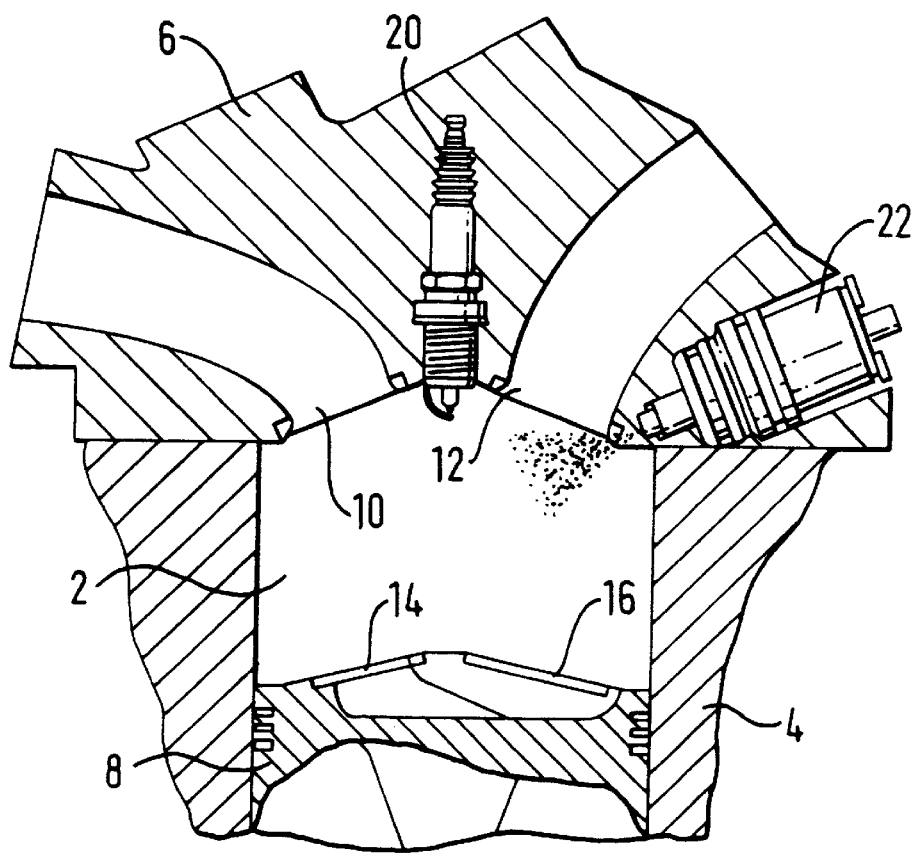
FIG. 1 is an axial section view of one cylinder and the associated portion of the cylinder head of a multi-cylinder, four valve, spark-ignited direct engine gasoline engine in accordance with the invention.

The engine includes a number of cylinders 2, of which only one is shown, which are formed in a cylinder block 4 and are closed by a common cylinder head 6. That portion of the cylinder head which is situated above each cylinder is of pent roof shape. Reciprocably accommodated in each cylinder is a piston 8 whose crown is of complementary pent roof shape and closely approaches the cylinder head at the top dead centre position. Communicating with the cylinder are two exhaust ports 10 (only one of which is shown) and two inlet ports 12 (only one of which is shown). Each exhaust port 10 and inlet port 12 is controlled by an associated valve in the conventional manner but these valves have been omitted for the sake of clarity. However, since the piston approaches the cylinder head very closely at the top dead centre position it will be seen that the piston crown has two recesses 14 and two further similar recesses 16 to accommodate the exhaust valves and inlet valves, respectively, to ensure that there is no mechanical contact between the valves and the piston. One of the inlet ports is of swirl-inducing type, e.g. of helical or directed type, which causes the air flowing in through it to swirl in the cylinder substantially about its axis in the direction shown by the arrows in FIG. 2. The other inlet port is not necessarily of swirl-inducing type and is in any event preferably provided with means known per se for disabling it at low load whereby air is admitted into the cylinder through both inlet ports at high speed and load but mostly through the swirl-inducing inlet port at low speed and load.

Formed in the piston crown is a recess 18 which effectively constitutes the combustion chamber. The detailed shape of the recess will be described below but, as may be seen in FIG. 2, it is generally of somewhat asymmetrical heart shape. Situated above the recess, and projecting a short way into it at the top dead centre position of the piston, is a spark plug 20 whose spark gap is situated, at the top dead centre position, adjacent the side wall of the recess at a position designated S in FIG. 2 adjacent the cusp of the heart. Situated circumferentially spaced from, and in this case generally opposite to, the spark plug is a fuel injector 22 whose nozzle is adjacent the side wall of the recess on its opposite side, when the piston is at the top dead centre position. The position of the fuel injector nozzle is designated F in FIG. 2.

Figure 2:
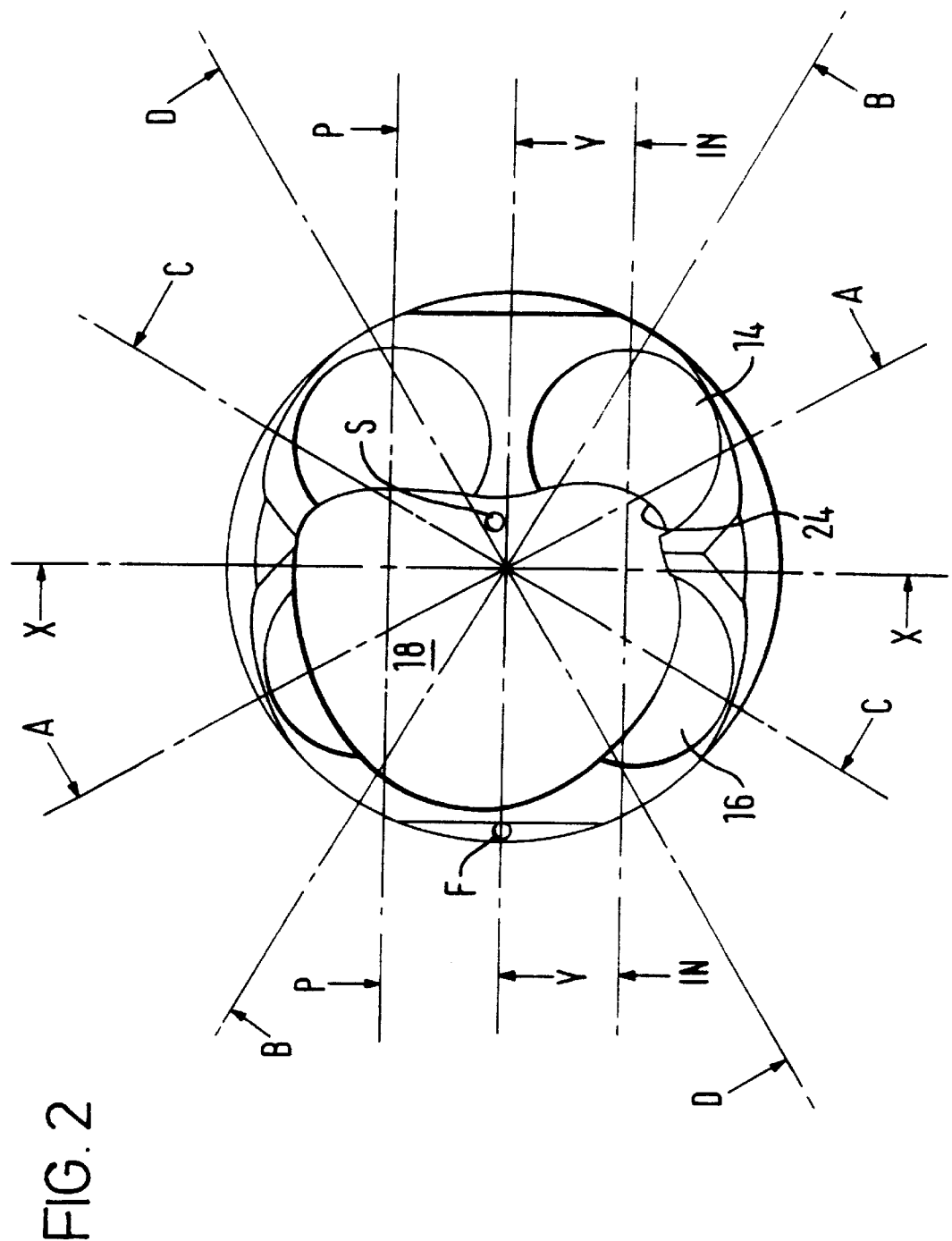
FIG. 2 is a plan view of the piston shown in FIG. 1.
Figure 3:
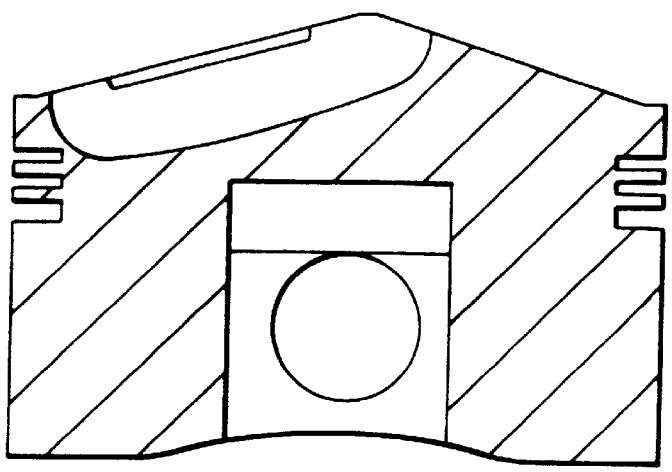
FIGS. 3 to 10 are sectional views of the piston on the lines Y—Y, D—D, C—C, X—X, A—A, B—B, IN—IN and P—P in FIG. 1, respectively.
Figure 4:
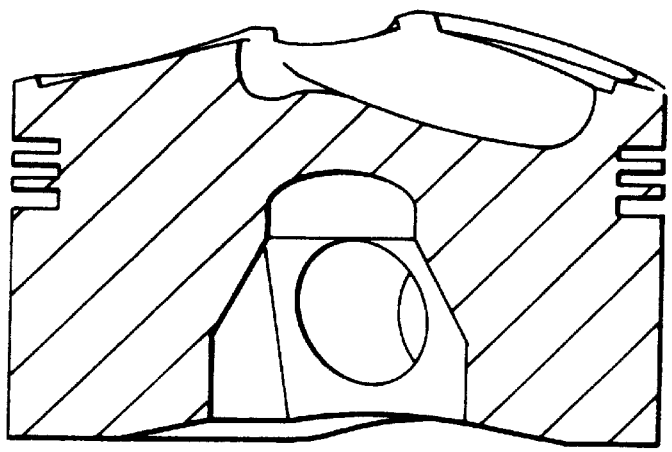
Figure 5:
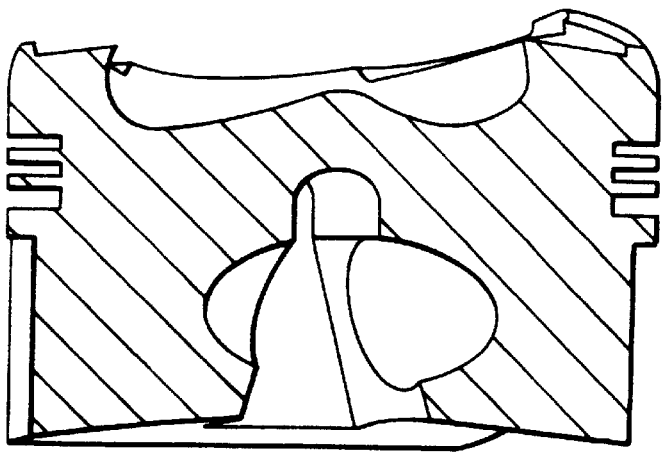
Figure 6:
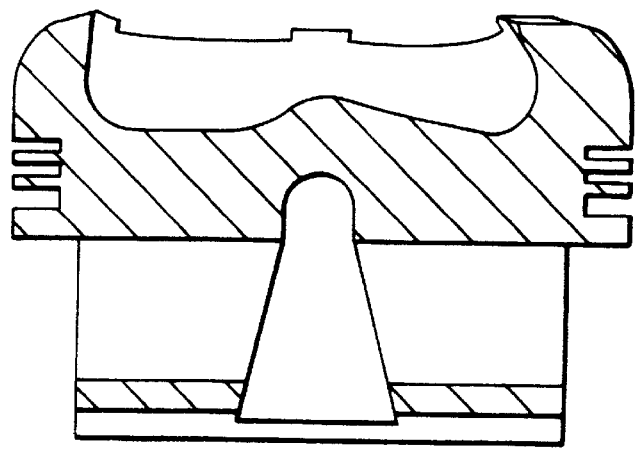
Figure 7:
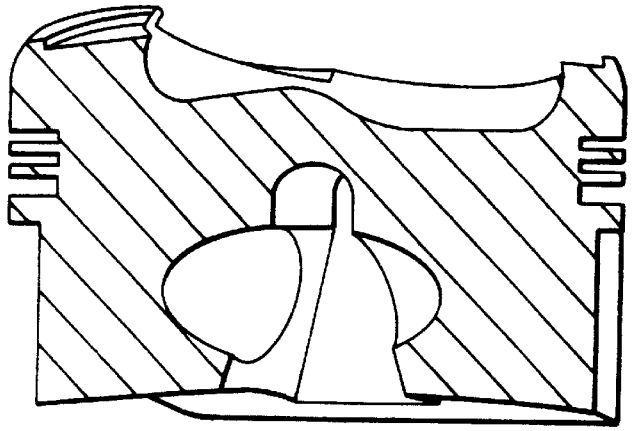
Figure 8:
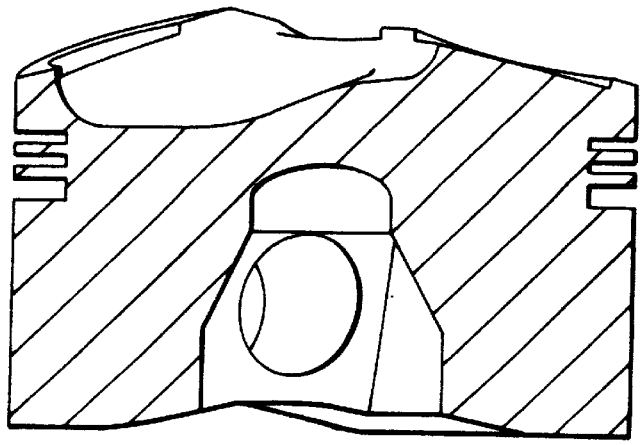
Figure 9:
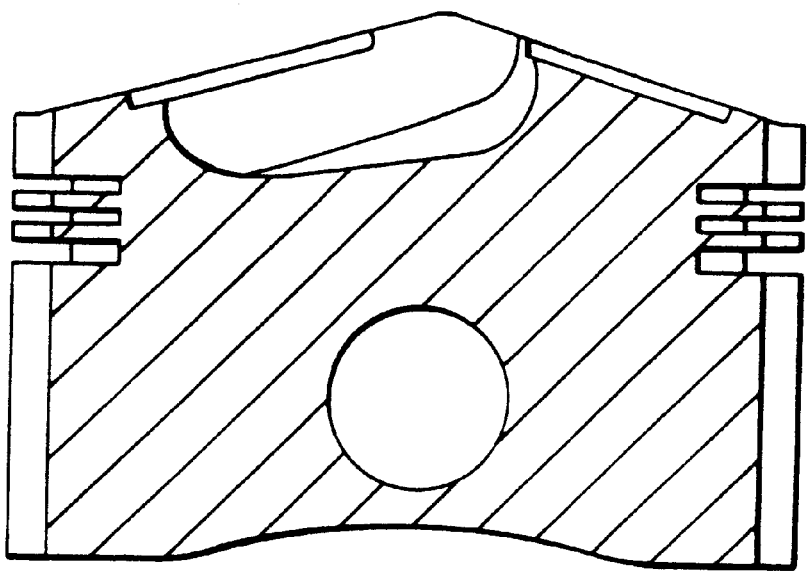
Figure 10:
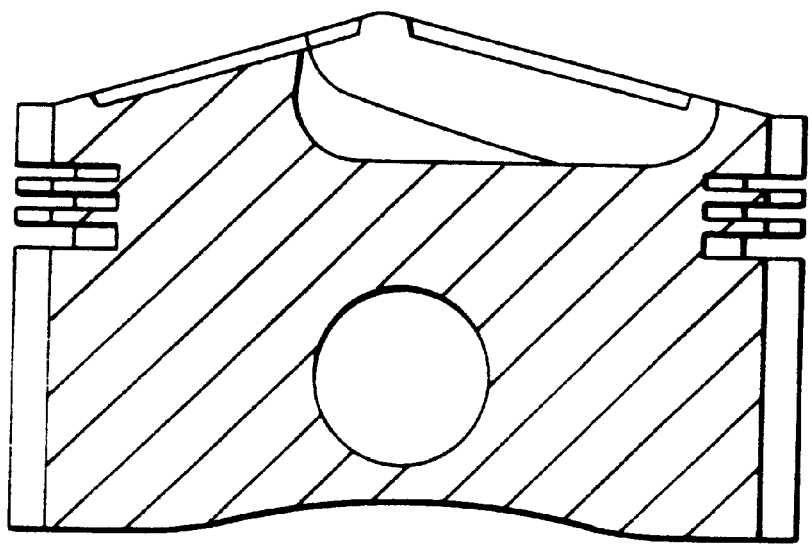

As may be seen in FIG. 2, the recess 18 effectively constitutes two communicating portions, namely the lower portion, as seen in FIG. 2, below the cusp of the heart and the upper portion, as seen in FIG. 2, above the cusp. The shape of the floor and side wall of the lower portion of the recess are crucial and it is to these features that the invention relates. However, the detailed shape of the upper portion is of no real importance insofar as the present invention is concerned and all that is of importance is that its overall volume is such that the compression ratio of the engine has the desired value. As mentioned above, the spark plug and the fuel injector are situated on opposite sides of the recess 18 and are in fact in this case located substantially on a diameter of the cylinder. The side wall 24 of the recess bordering the lower portion of it, as seen in FIG. 2, extending between the fuel injector and the spark plug is of arcuate shape and extends through more than 90° and indeed in the present case extends through substantially 180°. As may be seen in FIG. 3, the floor of the recess 18 along the line on which the spark plug and fuel injector nozzle are situated is substantially flat and inclined upwardly towards the spark plug. However, it may be seen also from FIGS. 4 to 8 that as one moves round the floor of the recess 18 adjacent the side wall 24 in the anticlockwise direction in FIG. 2, that is to say in the direction in which the air flow swirls in the combustion chamber, the floor of the recess moves progressively upwards, that is to say towards the cylinder head. This rising portion of the base of the recess constitutes a ramp 26. It may be seen also from FIGS. 4 to 6 that the floor of the recess 18 is inclined downwardly, that is to say away from the cylinder head, and outwardly from the centre over about the first 90° in the anticlockwise direction in FIG. 2 from the fuel injector.

In use, under high load conditions, air is admitted into the cylinder through both inlet ports 12 and fuel is injected by the fuel injector 22 during the compression stroke. The air and fuel are intimately mixed and thus produce a substantially homogeneous air/fuel mixture within the cylinder, and ultimately within the combustion chamber 18, which is subsequently ignited by the spark plug 20. This operation is referred to as homogeneous charging. Under low load conditions the engine is required to operate with so-called stratified charging and for this purpose-the engine inlet is not throttled, as in conventional engines. However, one of the inlet ports is at least partially disabled or blocked whereby air is permitted to flow into the cylinder predominantly through the swirl-inducing inlet port. This air is caused to swirl in the direction of the arrow seen in FIG. 2 and shortly before the piston reaches its top dead centre position this swirling air flow is substantially confined within the recess 18 and thus swirls around adjacent the side wall 24. The amount of fuel that is injected into the cylinder is, however, reduced very substantially and this fuel is injected in the form of a short burst of fuel shortly before ignition occurs. The fuel injector jet is arranged to inject a fine spray of fuel in the downward direction, that is to say towards the floor of the recess 18, and also in the lateral direction, that is to say downwardly as seen in FIG. 2, against the side wall 24 of the recess. The relatively small volume of fuel that is injected into the cylinder is vaporised by the heat of the piston and cylinder and the air temperature and is carried by momentum and the swirling air flow around the side wall of the recess 24 in the form of a relatively small and compact cloud of fuel/air mixture. The , compactness of this discrete cloud of fuel/air mixture is enhanced by the downward inclination of the base of the recess 18 in the radially outward direction. As the cloud of fuel and air moves around the side wall 24 it is inherently constrained also to move upwardly, that is to say towards the cylinder head, by the upward ramp 26. Accordingly, by the time the cloud of fuel and air has moved through about 180°, that is to say into the vicinity of the spark gap of the spark plug, its centre is located at or at least relatively close to the spark gap. Sparking then occurs and the air/fuel mixture is ignited because its AFR is less than 20:1, notwithstanding the fact that the AFR in the remainder of the combustion chamber is greater than this crucial value.

If the engine speed should increase somewhat from the previous low value, sparking will occur slightly more rapidly after the injection of fuel is terminated but on the other hand the swirling motion of the air within the combustion chamber may also be slightly faster, whereby these two factors may substantially cancel out and the cloud of air and fuel is still substantially in the vicinity of the spark gap when sparking occurs. However, it is of course not essential that the spark gap be in the centre of the cloud of the air and fuel at the time sparking occurs but what is of course essential is that it is within a region of the cloud of air and fuel at which the AFR is approximately 20:1 or richer. However, the fact that a component of motion towards the cylinder head is imparted to the cloud of air and fuel by the ramp means that there is a greater degree of latitude available than in the engine disclosed in EP-A-0694682 whereby the engine may operate under a stratified charging regime, that is to say without any substantial throttling of the inlet, over a wider range of speed and load than was previously possible, whereby the overall operating efficiency of the engine is increased.

What is claimed is:

1. A direct injection gasoline engine including at least one cylinder, said cylinder having an axis, a piston reciprocably mounted within said cylinder, said piston having a piston crown, a cylinder head closing said cylinder, a portion of said cylinder defined by said cylinder head and said piston constituting a combustion chamber, at least one inlet port adapted to cause swirl of inlet air in said cylinder substantially about said axis of said cylinder, said piston crown being provided with a recess which constitutes at least part of said combustion chamber, said recess having a floor and a side wall, a spark plug extending close to or into said recess, at the top dead centre position of said piston, at a position adjacent to said side wall of said recess and a fuel injector which is arranged to inject fuel into said recess and is situated adjacent said side wall of the recess, a portion of said side wall of said recess which is between said fuel injector and said spark plug being arcuate, when viewed in the direction of said axis of said cylinder, said floor of said recess adjacent the said portion of said side wall rising progressively towards said cylinder head over at least a part of the length of said portion of said side wall in the direction towards said spark plug.

2. An engine as claimed in claim 1 wherein said floor of said recess sinks progressively away from the cylinder head in the radially outward direction of said cylinder from said axis towards the said portion of said side wall over at least a proportion of the length of said portion of said side wall.

* * * * *